US009554419B2

(12) United States Patent
Kwon

(10) Patent No.: US 9,554,419 B2
(45) Date of Patent: Jan. 24, 2017

(54) PAIRING METHOD AND APPARATUS FOR AD-HOC CONNECTION IN WIRELESS COMMUNICATION TERMINAL

(75) Inventor: Soon-Hwan Kwon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1591 days.

(21) Appl. No.: 12/942,556

(22) Filed: Nov. 9, 2010

(65) Prior Publication Data
US 2011/0110522 A1  May 12, 2011

(30) Foreign Application Priority Data

Nov. 9, 2009 (KR) .................. 10-2009-0107370

(51) Int. Cl.
H04K 1/00 (2006.01)
H04W 84/18 (2009.01)
H04L 29/06 (2006.01)
H04W 12/04 (2009.01)
H04L 9/08 (2006.01)

(52) U.S. Cl.
CPC ............ *H04W 84/18* (2013.01); *H04L 9/0866* (2013.01); *H04L 63/061* (2013.01); *H04W 12/04* (2013.01); *H04L 2209/80* (2013.01)

(58) Field of Classification Search
CPC ... H04W 84/18; H04W 12/04; H04L 2209/80; H04L 9/0866; H04L 63/061
USPC . 380/255, 270, 278–285; 713/171; 726/2–6, 26–30
See application file for complete search history.

(56) References Cited

U.S. PATENT DOCUMENTS

| 6,687,721 | B1* | 2/2004 | Wells ...................... G06F 7/582 708/250 |
| 6,728,740 | B2 | 4/2004 | Kelly et al. |
| 6,959,382 | B1* | 10/2005 | Kinnis .................. G06F 21/602 713/168 |
| 7,684,563 | B1* | 3/2010 | Olson et al. .................... 380/28 |
| 7,757,274 | B2* | 7/2010 | Lillie .................... H04L 63/061 709/225 |
| 8,300,546 | B2* | 10/2012 | Shibuya et al. .............. 370/252 |
| 8,365,260 | B2* | 1/2013 | Gabriel ................... G06F 21/36 713/182 |
| 8,412,157 | B2* | 4/2013 | Wang et al. .................. 455/411 |
| 8,837,724 | B2* | 9/2014 | Rose ...................... H04L 63/08 380/247 |

(Continued)

FOREIGN PATENT DOCUMENTS

| KR | 1020000014730 | 3/2000 |
| KR | 1020020034379 | 5/2002 |

(Continued)

OTHER PUBLICATIONS

Korean Office Action dated Jan. 15, 2016 issued in counterpart application No. 10-2009-0107370, 10 pages.

(Continued)

*Primary Examiner* — Oleg Korsak
*Assistant Examiner* — Feliciano Mejia
(74) *Attorney, Agent, or Firm* — The Farrell Law Firm, P.C.

(57) ABSTRACT

A pairing method and an apparatus thereof for an ad-hoc connection in a wireless communication terminal are provided. In the method, an event duration that occurs according to user manipulation is measured. A pairing key is generated using the measured duration. A pairing procedure is performed with a counterpart terminal using the pairing key.

14 Claims, 7 Drawing Sheets

(56) References Cited

U.S. PATENT DOCUMENTS

| | | |
|---|---|---|
| 2004/0139339 A1* | 7/2004 | Yeh .................. G06F 21/62 |
| | | 713/193 |
| 2007/0188323 A1 | 8/2007 | Sinclair et al. |
| 2007/0233860 A1 | 10/2007 | Lillie et al. |
| 2007/0234063 A1 | 10/2007 | Ueda et al. |
| 2008/0240440 A1 | 10/2008 | Rose et al. |
| 2008/0320587 A1 | 12/2008 | Vauclair et al. |
| 2009/0300738 A1 | 12/2009 | Dewe et al. |

FOREIGN PATENT DOCUMENTS

| | | |
|---|---|---|
| KR | 1020070106426 | 11/2007 |
| KR | 1020090025292 | 3/2009 |

OTHER PUBLICATIONS

Korean Office Action dated Jul. 27, 2016 issued in counterpart application No. 10-2009-0107370, 11 pages.
European Search Report dated Oct. 26, 2016 issued in counterpart application No. 10828579.2-1853, 8 pages.

\* cited by examiner

PAIRING METHOD AND APPARATUS FOR AD-HOC CONNECTION IN WIRELESS COMMUNICATION TERMINAL

PRIORITY

This application claims priority under 35 U.S.C. §119(a) to a Korean patent application filed in the Korean Intellectual Property Office on Nov. 9, 2009 and assigned Serial No. 2009-0107370, the contents of which are incorporated herein by reference.

BACKGROUND OF THE INVENTION

1. Field of the Invention

The present invention relates generally to a pairing method and an apparatus for an ad-hoc connection in a wireless communication terminal, and more particularly, to a method and an apparatus for easily performing pairing for an ad-hoc connection between wireless communication terminals that use short distance wireless communication technology.

2. Description of the Related Art

As electronic and communication technologies develop, and large capacity multimedia data processing capabilities of electronic apparatuses improves, user requirements for the electronic apparatuses increase. For example, user requirements for multimedia data exchange between the electronic apparatuses have increased over time.

Accordingly, network technology enabling multimedia data exchange between electronic apparatuses, such as WiFi, Bluetooth, and Zigbee, so-called Wireless Personal Area Networks (WPAN), have been provided. That is, the WPAN technologies enable ad-hoc connection between apparatuses under an environment where a communication infrastructure is not established.

However, WiFi and Bluetooth technologies are inconvenient in that they have to search for a counterpart terminal, show search results as a list, and allow a user to directly determine one terminal, for ad-hoc connection. In addition, in case of the WiFi, terminals participating in ad-hoc connection must be set to the same Service Set IDentifier (SSID), the same encryption algorithm, and the same passphrase. In case of the Bluetooth, a name of a counterpart terminal participating in ad-hoc connection, and a PIN number must be known. For this reason, people generally find that the ad-hoc connection is difficult. That is, for the ad-hoc connection, the people need to recognize and understand terminologies such as an SSID, a WEB key, an encryption algorithm, a Bluetooth Device (BD) Address, a device name, etc.

Conventionally, a method for facilitating connection settings by inputting the same value at both terminals that are to perform an ad-hoc connection, and generating a key value suitable for WiFi or Bluetooth has been provided. However, the above method is inconvenient in that it requires a user to have to input the same number in person, and the method cannot be used in a terminal having no numerical keypad.

Accordingly, method for performing an ad-hoc connection after sharing necessary information in advance between terminals via a Near Field Communication (NFC) channel when performing pairing using an Out-Of-Band (OOB), such as the NFC, has been provided. The price of such a terminal may be raised.

SUMMARY OF THE INVENTION

An aspect of the present invention is to address at least the above-mentioned problems and/or disadvantages and to provide at least the advantages described below. Accordingly, an aspect of the present invention is to provide a pairing method and an apparatus thereof for an ad-hoc connection in a wireless communication terminal.

Another aspect of the present invention is to provide a method and an apparatus for generating a key value required for pairing by measuring a time for user manipulation in a wireless communication terminal that supports a short distance wireless communication technology.

In accordance with an aspect of the present invention, a pairing method for an ad-hoc connection in a wireless communication terminal is provided. The method includes measuring an event duration that occurs according to user manipulation, generating a pairing key using the measured duration, and performing a pairing procedure, with a counterpart terminal, using the pairing key.

In accordance with another aspect of the present invention, a pairing apparatus for an ad-hoc connection in a wireless communication terminal is provided. The apparatus includes a timer for measuring an event duration that occurs according to user manipulation, a pairing key generator for generating a pairing key using the measured duration, and a communication module for performing a pairing procedure with a counterpart terminal using the pairing key.

Other aspects, advantages and salient features of the invention will become apparent to those skilled in the art from the following detailed description, which, taken in conjunction with the annexed drawings, discloses embodiments of the invention.

BRIEF DESCRIPTION OF THE DRAWINGS

The above and other aspects, features and advantages of certain embodiments of the present invention will be more apparent from the following description taken in conjunction with the accompanying drawings in which.

Throughout the drawings, like reference numerals will be understood to refer to like parts, components and structures.

DETAILED DESCRIPTION OF EMBODIMENTS OF THE PRESENT INVENTION

Figure 1:
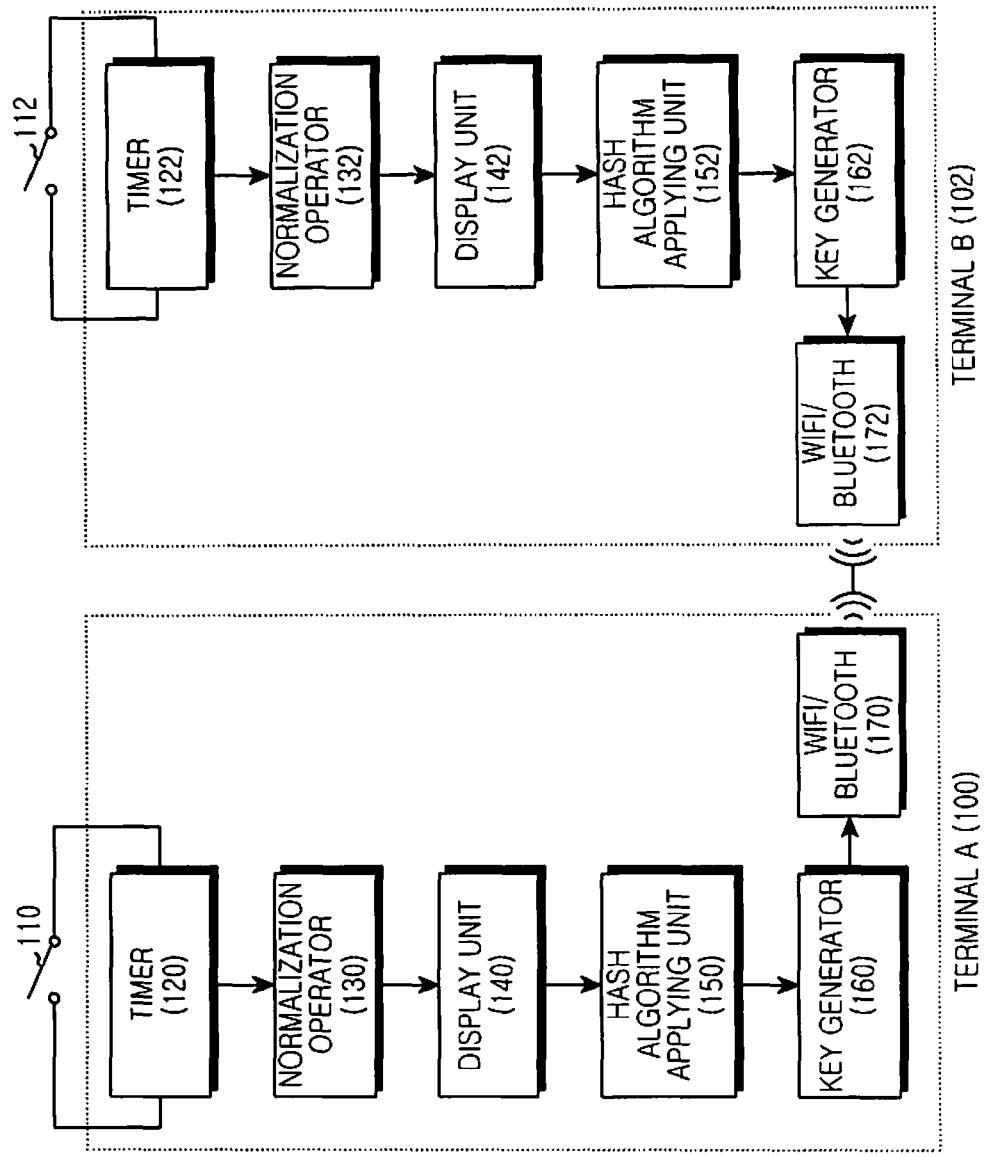
FIG. 1 is a block diagram illustrating wireless communication terminals according to an embodiment of the present invention.

Embodiments of the present invention are described in detail herein with reference to the accompanying drawings. In the drawings, the same or similar components may be designated by the same or similar reference numerals, although they are illustrated in different drawings. Further, detailed descriptions of constructions or processes known in the art may be omitted for the sake of clarity and conciseness, and to avoid obscuring the subject matter of the present invention.

The terms and words used in the following description and claims are not limited to the dictionary meanings, but are merely used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

Embodiments of the present invention provide a method and an apparatus for generating a key value required for pairing by measuring a time for user manipulation in a wireless communication terminal that supports a short distance communication technology. In the following description, a wireless communication terminal includes a mobile communication terminal, a computer, a Personal Digital Assistant (PDA), a Motion Picture Expert Group Audio Layer-3 (MP3) player, a Television (TV), a headset, a microphone, a speaker, and a display unit that supports a short distance wireless communication technology. In addition, though embodiments of the present invention are described using WiFi and Bluetooth as the short distance wireless communication technology, the present invention is also applicable to different types of short distance wireless communication technology. In addition, though embodiments of the present invention are described using two wireless communication terminals as an example for convenience in description, the present invention is applicable to more than two wireless communication terminals.

FIG. 1 is a block diagram illustrating wireless communication terminals according to an embodiment of the present invention.

Referring to FIG. 1, terminal A 100 and terminal B 102 include an input unit 110 and 112, a timer 120 and 122, a normalization operator 130 and 132, a display unit 140 and 142, a HASH algorithm applying unit 150 and 152, a key generator 160 and 162, and a WiFi/Bluetooth module 170 and 172, respectively.

The input unit 110 (112) includes at least one function key or touch sensor and provides a key input or touch operation by a user to the timer 120 (122).

The timer 120 (122) measures a time for which the key input is maintained or a time for which the touch operation is maintained. That is, the timer 120 (122) measures a duration of an operation that occurs according to user manipulation. For example, when a user presses a key of the input unit 110 (112) for a predetermined time, the timer 120 (122) measures a time for which the key is pressed. When a user touches the input unit 110 (112) for a predetermined time, the timer 120 (122) measures a time for which the input unit 110 (112) is touched.

The normalization operator 130 (132) performs a normalization operation on a time measured by the timer 120 (122). That is, as shown in Equation (1), the normalization operator 130 (132) divides a time measured by the timer 120 (122) by a predetermined reference value, and obtains a quotient thereof. This is for removing a difference generated between times measured by the timers 120 and 122, respectively, since times for which the keys of the terminal A 100 and the terminal B 102 are pressed or touched by a user are different.

Equation (1) represents a normalization operation on a time measured.

$$C = (\Delta - \Delta \% G)/G \qquad (1)$$

where $\Delta$ denotes a time measured by the timers 120 and 122, and G denotes a set reference value. Here, G denotes a maximum time difference that may obtain the same normalization operation result value even though times measured by the two terminals according to user manipulation are different.

For example, assuming that a difference between pressed times when a user simultaneously presses the keys of the terminal A 100 and the terminal B 102 does not exceed 100 ms, the normalization operators 130 and 132 of the terminal A 100 and the terminal B 102 may obtain a normalization operation result value as follows.

EXAMPLE 1

Time for which key of terminal A 100 has been pressed: 3452 msec=>34 (3.4 sec)
Time for which key of terminal B 102 has been pressed: 3470 msec=>34 (3.4 sec)

EXAMPLE 2

Time for which key of terminal A 100 has been pressed: 2498 msec=>24 (2.4 sec)
Time for which key of terminal B 102 has been pressed: 2520 msec=>25 (2.5 sec)

Here, in case of example 1, the terminals A 100 and B 102 may obtain the same normalization operation result value, but in case of example 2, the terminals A 100 and B 102 obtain different normalization operation result values. At this point, probability that the terminals A 100 and B 102 obtain different normalization operation result values is not high, but to prevent this, each of the normalization operators 130 and 132 obtains a normalization operation result value obtained by itself and neighboring values to provide them to the display unit 140 (142), so that the display unit 140 (142) displays the normalization operation result value and the neighboring values.

Figure 2:
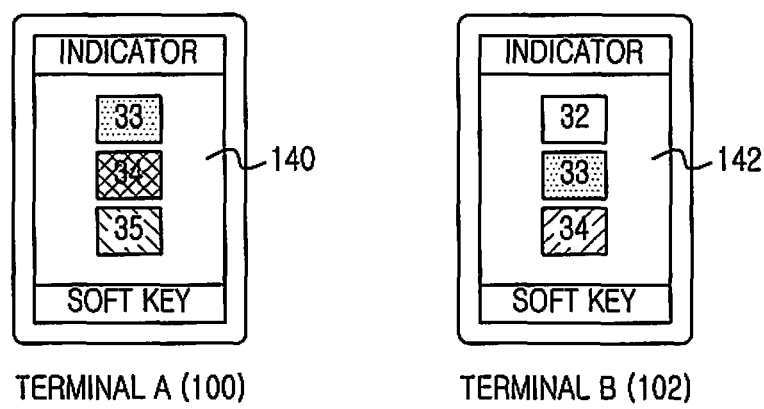
FIG. 2 is a view illustrating a screen for determining a channel value in a wireless communication terminal according to an embodiment of the present invention.

That is, the display unit 140 (142) displays an operation result value, and neighboring values thereof, provided by the normalization operator 130 (132) on a screen. At this point, the display unit 140 (142) may display a message requesting a user to determine one value to be used as a channel value from the displayed values. For example, in the case where a normalization operation result value of the terminal A 100 is 34 and a normalization operation result value of the terminal B 102 is 33, the display unit 140 (142) may display the normalization operation result value of each terminal and a neighboring value on a screen as illustrated in FIG. 2. Here, as neighboring values, a normalization operation result value and two neighboring values having differences of −1 and +1 have been displayed, but the number of displayed neighboring values may change. In addition, the displayed values may be changed by a user's key manipulation or touch. The display unit 140 (142) may induce a user to easily determine the same value as a channel value by giving effects such as color, thickness, size, background color, background pattern to a displayed each value to improve visibility.

Here, the terminal A 100 (B 102) may determine one value from the displayed values through the input unit 110 (112). Terminal A 100 (B 102) then determines the determined value as a channel value to provide the same to the HASH algorithm applying unit 150 (152). At this point, channel values of the terminal A 100 and the terminal B 102 should be the same.

The HASH algorithm applying unit 150 (152) determines one HASH algorithm from a plurality of HASH algorithms depending on the channel value. For example, the HASH algorithm applying unit 150 (152) may determine one HASH algorithm using a value obtained by performing a modular operation on the channel value using the number of HASH algorithms, as an index. The determining of one HASH algorithm from the plurality of HASH algorithms may be performed through any method, but the same HASH algorithm should be determined in the terminals A 100 and B 102. The determining of an HASH algorithm depending on the channel value improves security by using a different algorithm depending on a channel value.

When one HASH algorithm is determined, the HASH algorithm applying unit 150 (152) applies the channel value to the determined algorithm to obtain a HASH value, and provides the obtained HASH value to the key generator 160 (162).

The key generator 160 (162) generates a pairing key value using a predetermined method using the HASH value provided from the HASH algorithm applying unit 150 (152) and provides the same to the WiFi/Bluetooth module 170 (172). For example, in the case of supporting WiFi, the key generator 160 (162) divides a HASH value expressed in terms of a byte string using a predetermined method to generate an SSID and a web key. In the case of supporting Bluetooth, the key generator 160 (162) divides the HASH value using a predetermined method to generate a device name and a PIN number. More specifically, in the case where the HASH value is da2faa3425d09ffa31ec2af10ec7f23aff1049dd, the key generator 160 (162) may generate 'SSID: da2faa3425d09ffa31ec2af1, web key: 0ec7f23aff1049dd' in order to support the WiFi, and may generate 'apparatus name: da2faa3425d09ffa31ec2af1, PIN number: 0ec7f23aff1049dd' in order to support the Bluetooth.

The WiFi/Bluetooth module 170 (172) performs pairing with a counterpart terminal according to a predetermined method using a pairing key generated by the key generator 160 (162).

The functions of the normalization operator 130 (132), the display unit 140 (142), the HASH algorithm applying unit 150 (152), and the key generator 160 (162) may be performed by one functional block. That is, the normalization operator 130 (132), the display unit 140 (142), the HASH algorithm applying unit 150 (152), and the key generator 160 (162) may be integrated into one functional block and divided into a plurality of functional blocks of different types within the scope of the present invention.

Figure 3:
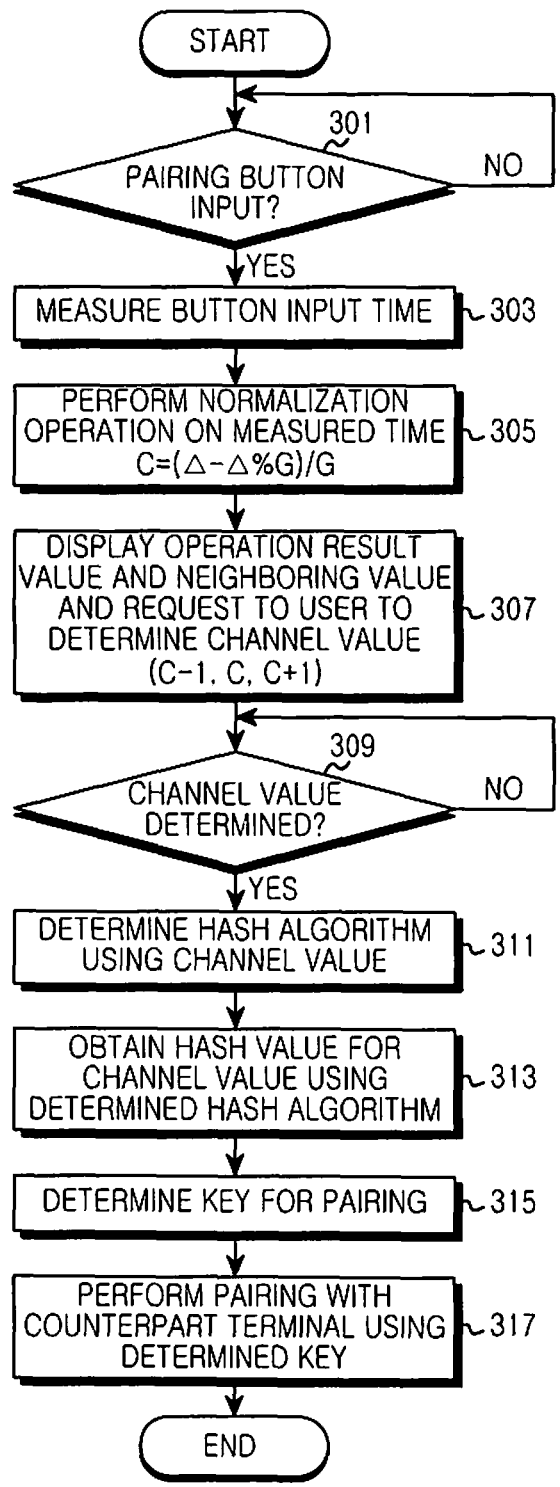
FIG. 3 is a flowchart illustrating an operation procedure for generating a key value required for pairing in a wireless communication terminal according to an embodiment of the present invention.

FIG. 3 is a flowchart illustrating an operation procedure for generating a key value required for pairing in a wireless communication terminal according to an exemplary embodiment of the present invention. In FIG. 3, an embodiment of the present invention is described using the example of generating a pairing key by inputting a specific key button.

Referring to FIG. 3, the terminal determines whether a button for pairing is input in step 301. When the button for pairing is input, the terminal measures duration for which the button input is maintained using a timer in step 303.

The terminal performs a normalization operation on the measured time, as in Equation (1), in step 305 to obtain a normalization operation result value, and displays the normalization operation result value and neighboring values of the operation result value on a screen, as in FIG. 2, to request a user to determine a channel value in step 307.

The terminal determines whether a channel value is determined from the values displayed on the screen in step 309. When the channel value is determined, the terminal determines one HASH algorithm from a plurality of HASH algorithms according to the channel value in step 311, and obtains a HASH value for the channel value using the determined HASH algorithm in step 313.

The terminal determines a key for pairing using a predetermined method using the HASH value in step 315. For example, in the case of supporting WiFi, the terminal may divide a HASH value expressed in terms of a byte string using a predetermined method to generate an SSID and a web key. In the case of supporting Bluetooth, the terminal may divide the HASH value using a predetermined method to generate a device name and a PIN number.

The terminal performs pairing with a counterpart terminal using the determined key in step 317, and ends the present algorithm.

Figure 4A:
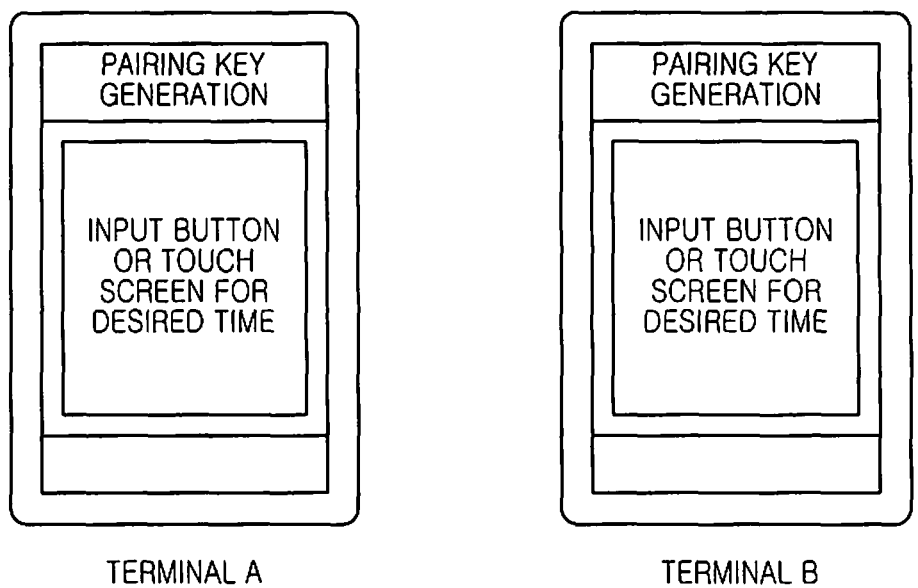
FIGS. 4A to 4C are views illustrating screen construction for performing a pairing procedure between wireless communication terminals according to an embodiment of the present invention.
Figure 4B:
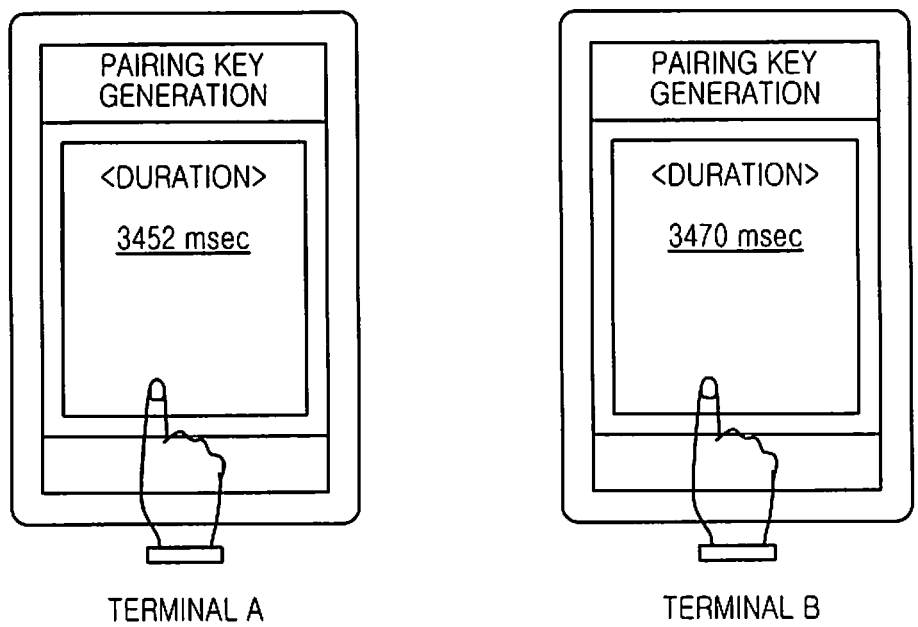
Figure 4C:
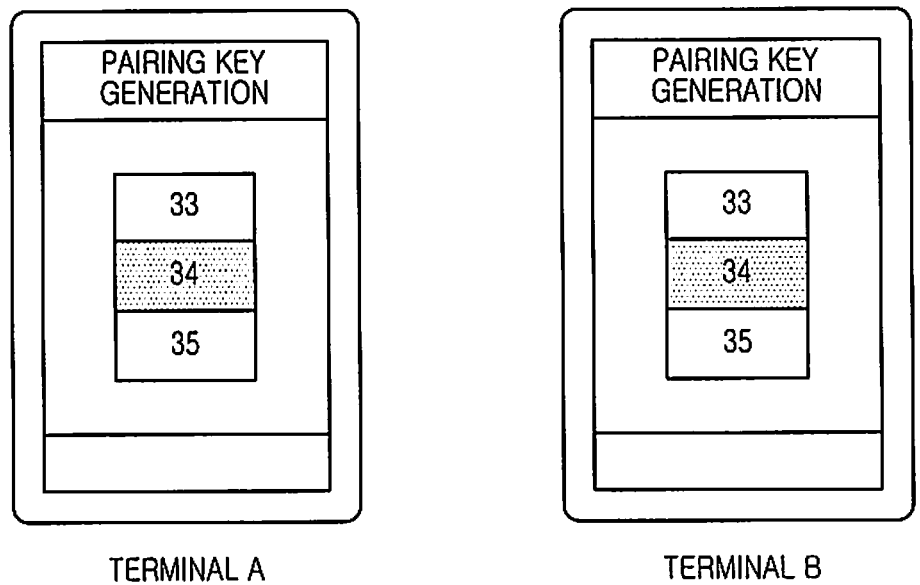

FIGS. 4A to 4C illustrate screen construction for performing a pairing procedure between wireless communication terminals according to an embodiment of the present invention.

First, when the terminals A and B recognize that an event for pairing occurs according to a user's menu manipulation, the terminals A and B may display a message requesting the user to touch a key button or a screen area in order to generate a pairing key on the screen as illustrated in FIG. 4A. At this point, the key button is not limited to a specific key but may be one of all keys provided to the terminal. In addition, the screen area is not limited to a specific area of the screen but any area that may detect the user's touch or input may be used.

When the user's screen touch occurs on the terminals A and B according to the request, the terminals A and B measure a time for which the user's screen touch is maintained as illustrated in FIG. 4B. That is, terminals A and B measure time duration from a time at which the user starts screen touch to a time at which the user ends the screen touch.

After that, the terminals A and B perform a normalization operation on the measured time and display a normalization operation result value and neighboring values on a screen to allow the user to determine a value to be used for pairing as illustrated in FIG. 4C. At this point, when a specific value is determined by the user, the terminals A and B generate a pairing key based on the determined specific value to perform a pairing procedure.

Figure 5:
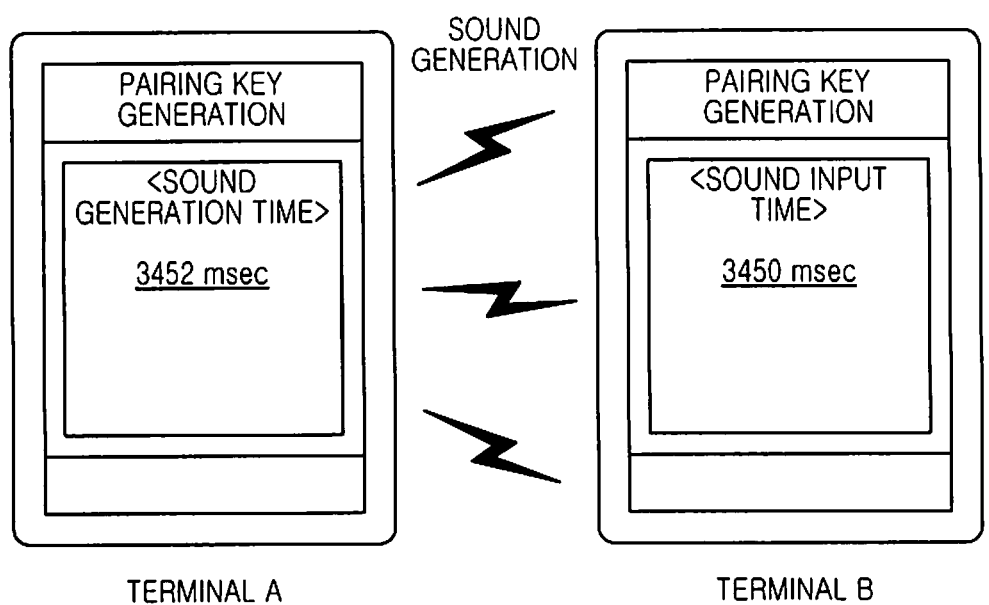
FIG. 5 is a view illustrating an example where a pairing procedure is performed using sounds between wireless communication terminals according to an embodiment of the present invention.

Though the case where each terminal measures a time for which a user presses or touches a key to generate a pairing key has been described in the above embodiments of the present invention, one terminal may generate a sound or light for an arbitrary time, and then each terminal may measure it and generate a pairing key based on the measured time. For example, as illustrated in FIG. 5, terminal A generates a sound, and then measures a time for which the sound is maintained, while terminal B measures a time at which the sound is input from the terminal A to generate a pairing key.

That is, the above-described embodiments of the present invention is not limited to a key input or touch time, but is applicable to the case of measuring a predetermined time through various methods.

Embodiments of the present invention may provide an ad-hoc connection method having excellent security and usability without adding a separate part by measuring a time for user manipulation and generating a key value required for pairing in a wireless communication terminal that supports a short distance wireless communication technology. Therefore, a general user may easily perform an ad-hoc connection.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A pairing method for a connection in a wireless communication terminal, the method comprising:
   measuring, by a timer, an event duration that occurs according to user manipulation;
   generating, by a pairing key generator, a pairing key using the measured duration; and
   performing, by a communication module, a pairing procedure with a counterpart terminal using the pairing key, wherein the generating of the pairing key using the measured duration comprises applying a conversion function to the measured duration, wherein the applying of the conversion function to the measured duration comprises:
   performing a normalization operation on the measured duration; and
   applying the conversion function to a value obtained by the normalization operation, wherein the normalization operation is performed using:

$$C=(\Delta-\Delta \% G)/G$$

where $\Delta$ denotes the measured time, and G denotes a reference value set in advance.

2. The method of claim 1, wherein the event according to the user manipulation comprises at least one of a key input, a screen touch, sound generation, and light generation.

3. The method of claim 1, wherein the performing of the normalization operation comprises:
   displaying a normalization operation result value and at least one value neighboring the result value; and
   determining one of the displayed values by the user.

4. The method of claim 3, wherein while the normalization operation result value and the at least one value neighboring the result value are displayed, at least one effect of color, thickness, size, background color, and background pattern is given to each value.

5. The method of claim 1, further comprising:
   determining one conversion function from a plurality of conversion functions according to the value obtained by the normalization operation.

6. The method of claim 1, wherein the connection is ad-hoc connection, and
   wherein the pairing key comprises at least one of a Service Set IDentifier (SSID), a web key, a device name, and a PIN number.

7. The method of claim 6, wherein at least one of the SSID, the web key, the device name, and the PIN number is generated by dividing the pairing key using a predetermined method.

8. A pairing apparatus for a connection in a wireless communication terminal, the apparatus comprising:
   a timer for measuring an event duration that occurs according to user manipulation;
   a pairing key generator for generating a pairing key using the measured duration; and
   a communication module for performing a pairing procedure with a counterpart terminal using the pairing key, wherein the pairing key generator applies a conversion function to the measured duration, wherein the pairing key generator performs a normalization operation on the measured duration, and applies the conversion function to a value obtained by the normalization operation, wherein the pairing key generator performs the normalization operation using:

$$C=(\Delta-\Delta \% G)/G$$

where $\Delta$ denotes the measured time, and G denotes a reference value set in advance.

9. The apparatus of claim 8, wherein the event according to the user manipulation comprises at least one of a key input, a screen touch, sound generation, and light generation.

10. The apparatus of claim 8, wherein the pairing key generator controls displaying of the normalization operation result value and at least one value neighboring the result value, and determine one of the displayed values by the user.

11. The apparatus of claim 10, wherein when the displaying of the normalization operation result value and the at least one value neighboring the result value, the pairing key generator gives at least one effect of color, thickness, size, background color, and background pattern to the value.

12. The apparatus of claim 8, wherein the pairing key generator determines one conversion function from a plurality of conversion functions according to the value obtained by the normalization operation.

13. The apparatus of claim 8, wherein the connection is ad-hoc connection, and
   wherein the pairing key comprises at least one of a Service Set IDentifier (SSID), a web key, a device name, and a PIN number.

14. The apparatus of claim 13, wherein the pairing key generator generates at least one of the SSID, the web key, the device name, and the PIN number by dividing the pairing key using a predetermined method.

* * * * *